(12) United States Patent
Branlund et al.

(10) Patent No.: US 10,110,270 B2
(45) Date of Patent: Oct. 23, 2018

(54) PRECISION ARRAY PROCESSING USING SEMI-COHERENT TRANSCEIVERS

(71) Applicant: Tarana Wireless, Inc., Santa Clara, CA (US)

(72) Inventors: Dale Branlund, Portola Valley, CA (US); Harry May, Sunnyvale, CA (US)

(73) Assignee: TARANA WIRELESS, INC., Santa Clara, CA (US)

( * ) Notice: Subject to any disclaimer, the term of this patent is extended or adjusted under 35 U.S.C. 154(b) by 128 days.

(21) Appl. No.: 13/831,535

(22) Filed: Mar. 14, 2013

(65) Prior Publication Data

US 2014/0269785 A1    Sep. 18, 2014

(51) Int. Cl.
*H04B 1/40* (2015.01)

(52) U.S. Cl.
CPC ..................... *H04B 1/40* (2013.01)

(58) Field of Classification Search
None
See application file for complete search history.

(56) References Cited

U.S. PATENT DOCUMENTS

| | | | |
|---|---|---|---|
| 6,122,260 A | 9/2000 | Liu et al. | |
| 6,219,561 B1 | 4/2001 | Raleigh | |
| 6,289,062 B1 | 9/2001 | Wang et al. | |
| 6,580,328 B2 | 6/2003 | Tan et al. | |
| 6,771,985 B1 | 8/2004 | Iinuma | |
| 6,795,424 B1 | 9/2004 | Kapoor et al. | |
| 6,865,169 B1 | 3/2005 | Quayle et al. | |
| 7,003,310 B1 | 2/2006 | Youssefmir et al. | |
| 7,187,723 B1* | 3/2007 | Kawanabe | H04B 7/084 342/371 |
| 7,333,455 B1 | 2/2008 | Bolt et al. | |
| 7,340,279 B2 | 3/2008 | Chen et al. | |
| 7,366,120 B2 | 4/2008 | Handforth et al. | |
| 7,493,129 B1 | 2/2009 | Mostafa et al. | |
| 7,502,355 B2 | 3/2009 | Bednekoff et al. | |
| 7,567,543 B2 | 7/2009 | Cao et al. | |
| 7,640,020 B2 | 12/2009 | Gutowski | |
| 7,646,752 B1 | 1/2010 | Periyalwar et al. | |
| 7,688,739 B2 | 3/2010 | Frei et al. | |
| 7,720,444 B2 | 5/2010 | Darabi et al. | |
| 7,839,856 B2 | 11/2010 | Sinha et al. | |
| 8,238,318 B1 | 8/2012 | Kegus | |
| 8,416,872 B2 | 4/2013 | Higuchi et al. | |
| 8,502,733 B1* | 8/2013 | Negus et al. ................. 342/359 |
| 8,531,471 B2 | 9/2013 | Chen et al. | |

(Continued)

FOREIGN PATENT DOCUMENTS

| | | |
|---|---|---|
| EP | 2071745 | 2/2011 |
| GB | 2350265 | 11/2000 |

(Continued)

OTHER PUBLICATIONS

"Adaptive Frequency-Domain Equalization and Diversity Combining for Broadband Wireless Communications" by Martin V. Clark; IEEE Journal; dated Oct. 1998.

(Continued)

*Primary Examiner* — Awet Haile
(74) *Attorney, Agent, or Firm* — DLA Piper LLP (US)

(57) ABSTRACT

A system and method for precision array processing using semi-coherent transceivers are disclosed.

3 Claims, 10 Drawing Sheets

(56) References Cited

U.S. PATENT DOCUMENTS

| | | |
|---|---|---|
| 8,811,348 B2 | 8/2014 | Rangan et al. |
| 9,252,908 B1 | 2/2016 | Branlund |
| 9,325,409 B1 | 4/2016 | Branlund |
| 9,456,354 B2 | 9/2016 | Branlund |
| 9,502,022 B2 | 11/2016 | Chang et al. |
| 9,735,940 B1 | 8/2017 | Bakr et al. |
| 2002/0042290 A1 | 4/2002 | Williams et al. |
| 2003/0035468 A1 | 2/2003 | Corbaton et al. |
| 2005/0141624 A1 | 6/2005 | Lakshmipathi et al. |
| 2005/0245192 A1 | 11/2005 | Karabinis et al. |
| 2006/0119440 A1* | 6/2006 | Isobe .................. H03L 7/0802 331/16 |
| 2006/0135070 A1 | 6/2006 | Karabinis |
| 2008/0117101 A1 | 5/2008 | Pan |
| 2008/0130496 A1 | 6/2008 | Kuo et al. |
| 2008/0214196 A1 | 9/2008 | Sambhwani |
| 2008/0233967 A1 | 9/2008 | Montojo et al. |
| 2008/0247388 A1 | 10/2008 | Horn |
| 2008/0261602 A1 | 10/2008 | Livneh |
| 2008/0278394 A1 | 11/2008 | Koh et al. |
| 2008/0317014 A1 | 12/2008 | Veselinovic et al. |
| 2009/0110033 A1 | 4/2009 | Shattil |
| 2009/0310693 A1 | 12/2009 | Baker et al. |
| 2009/0316675 A1 | 12/2009 | Malladi |
| 2010/0035620 A1 | 2/2010 | Naden et al. |
| 2010/0046595 A1 | 2/2010 | Sikri et al. |
| 2010/0067476 A1 | 3/2010 | Periyalwar et al. |
| 2010/0087149 A1 | 4/2010 | Srinivasan et al. |
| 2010/0093391 A1 | 4/2010 | Saban et al. |
| 2010/0195619 A1 | 8/2010 | Bonneville et al. |
| 2010/0215032 A1 | 8/2010 | Jalloul et al. |
| 2010/0248644 A1* | 9/2010 | Kishi .................. H04L 7/0008 455/68 |
| 2010/0254295 A1 | 10/2010 | Ahn et al. |
| 2010/0296459 A1 | 11/2010 | Miki et al. |
| 2011/0034200 A1 | 2/2011 | Leabman |
| 2011/0039509 A1* | 2/2011 | Bruchner .................. 455/232.1 |
| 2011/0051731 A1 | 3/2011 | Mang et al. |
| 2011/0105054 A1* | 5/2011 | Cavin .................. H03L 7/07 455/86 |
| 2011/0269410 A1 | 11/2011 | Tsujimoto et al. |
| 2011/0274032 A1 | 11/2011 | Leng et al. |
| 2012/0108257 A1 | 5/2012 | Kwon et al. |
| 2012/0129539 A1 | 5/2012 | Arad et al. |
| 2013/0044028 A1 | 2/2013 | Lea et al. |
| 2013/0094522 A1 | 4/2013 | Moshfeghi |
| 2013/0095747 A1 | 4/2013 | Moshfeghi |
| 2013/0142136 A1 | 6/2013 | Pi et al. |
| 2013/0207841 A1 | 8/2013 | Negus et al. |
| 2013/0237261 A1 | 9/2013 | Bazzi |
| 2015/0124713 A1 | 5/2015 | Salhov et al. |
| 2015/0244458 A1 | 8/2015 | Erkmen |
| 2016/0119052 A1 | 4/2016 | Frerking |

FOREIGN PATENT DOCUMENTS

| | | |
|---|---|---|
| JP | 2010-522516 | 7/2010 |
| JP | 2010-525678 | 7/2010 |
| JP | 2010-183573 | 8/2010 |
| WO | 9820633 | 5/1998 |
| WO | 0205493 | 1/2002 |
| WO | 02063896 | 8/2002 |
| WO | 2005101882 | 10/2005 |
| WO | 2007082142 | 7/2007 |
| WO | 2008033369 | 3/2008 |
| WO | 2009119463 | 10/2009 |
| WO | 2010003509 | 1/2010 |
| WO | 2010013245 | 2/2010 |
| WO | 2012037643 | 3/2012 |

OTHER PUBLICATIONS

"The Bits and Flops of the N-hop Multilateration Primitive for Node Localization Problems" by Andreas Savvides et al.; UCLA; dated Sep. 28, 2002.

"Echo Cancellation and Channel Estimation for On-Channel Repeaters in DVB-T/H Networks" by Karim M. Nasr et al.; Brunel University; dated after Jan. 2006.

"Load- and Interference-Aware Channel Assignment for Dual-Radio Mesh Backhauls" by Michelle X. Gong et al.; IEEE Communications Society; dated 2008.

"Signal Acquisition and Tracking with Adaptive Arrays in the Digital Mobile Radio System IS-54 with Flat Fading" by Jack H. Winters; IEEE Transactions; dated Nov. 4, 1993.

PCT International Search Report of PCT/US14/26696; dated Sep. 19, 2014; (2 pgs.).

PCT Written Opinion of the International Searching Authority of PCT/US14/26696; dated Sep. 19, 2014; (4 pgs.).

* cited by examiner

PRECISION ARRAY PROCESSING USING SEMI-COHERENT TRANSCEIVERS

FIELD

The disclosure relates generally to adaptive array processing and in particular to using semi-coherent transceivers for adaptive array processing.

BACKGROUND

Modern communications, radar, and wireless systems use adaptive array processing as part of the system. The adaptive array processing is often being done using all digital processing or a mixture of digital and analogue processing. These systems include receivers, transmitters and transceivers that coherently down-convert/up-convert radio frequency (RF) and microwave signals to low intermediate frequency (IF)/analogue signals or digital baseband signals. Coherency is important since beamformers or interference cancellers point beams and nulls where the accuracy of pointing depends on stable amplitude and phase responses for each of the transceivers in the architecture. To achieve coherency, many systems use a common clock, local oscillator and/or synthesizer and a distribution network to each of the transceivers in the architecture. The coherency ensures that phase, amplitude and frequency fluctuations of these sources are "common mode" with respect to the array response. Thus, beam pointing and null steering accuracy is not affected by these impairments. However, as the number of transceivers increases in the system, it is very cumbersome to distribute the clock signals, error prone and potentially costly. This is particular true if the system has distributed component/antennas where cabling and connectors can become significant sources of cost and error in the design.

Thus, it is desirable to provide a precision array processing using semi-coherent transceivers and it is to this end that the disclosure is directed.

DETAILED DESCRIPTION OF ONE OR MORE EMBODIMENTS

The disclosure is particularly applicable to a precision array processing system in a wireless communications system and it is in this context that the disclosure will be described. It will be appreciated, however, that the system and method has greater utility since the precision array processing system with semi-coherent transceivers may be used for other communication system, radar systems or other systems that use precision array processing.

Figure 1:
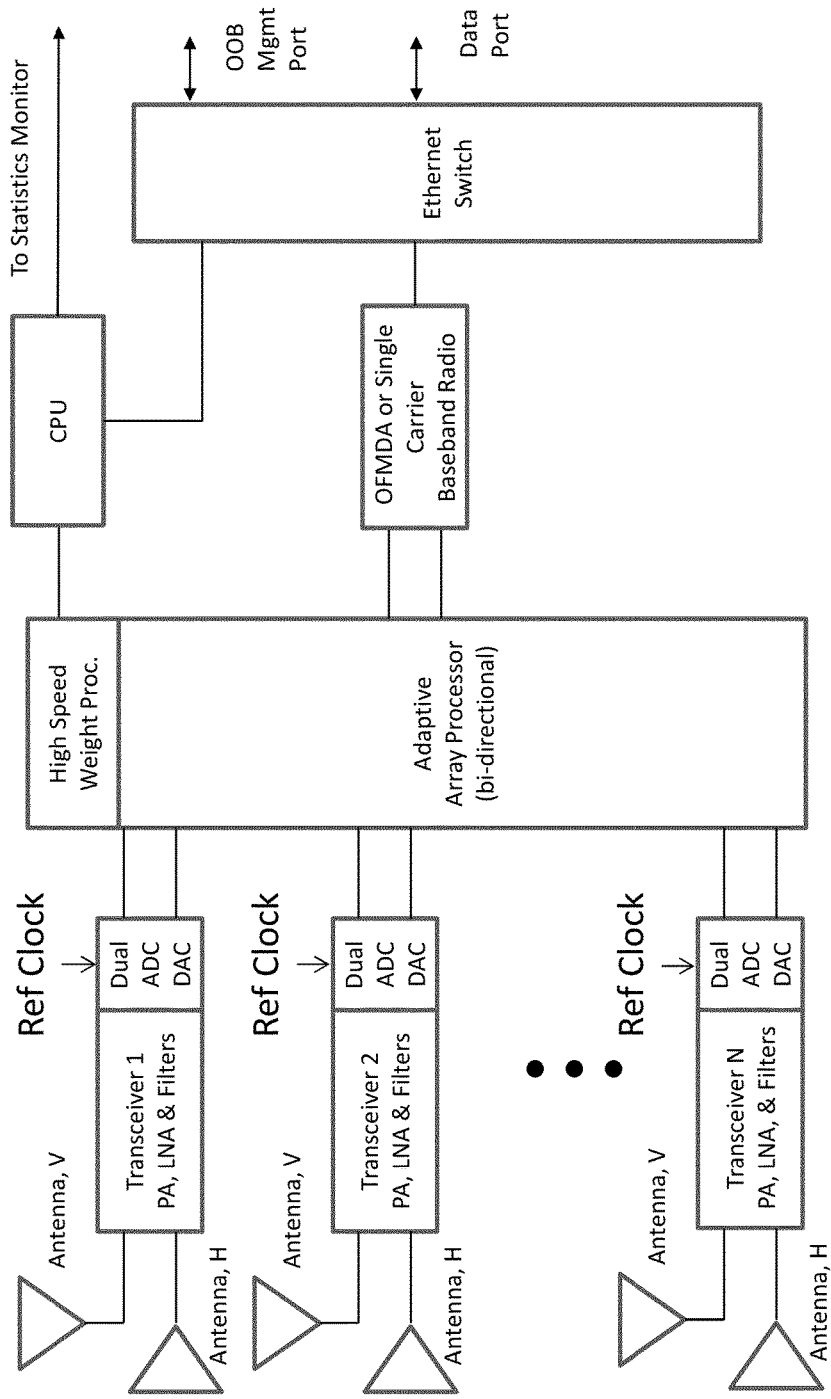
FIG. 1 illustrates a precision array radio system using a semi-coherent transceiver subsystem

FIG. 1 illustrates an adaptive array radio system comprised of an N channel semi-coherent RF transceiver subsystem, adaptive array processing subsystem, baseband radio, control CPU and Ethernet switch, herein called an adaptive array radio system.

Figure 2:
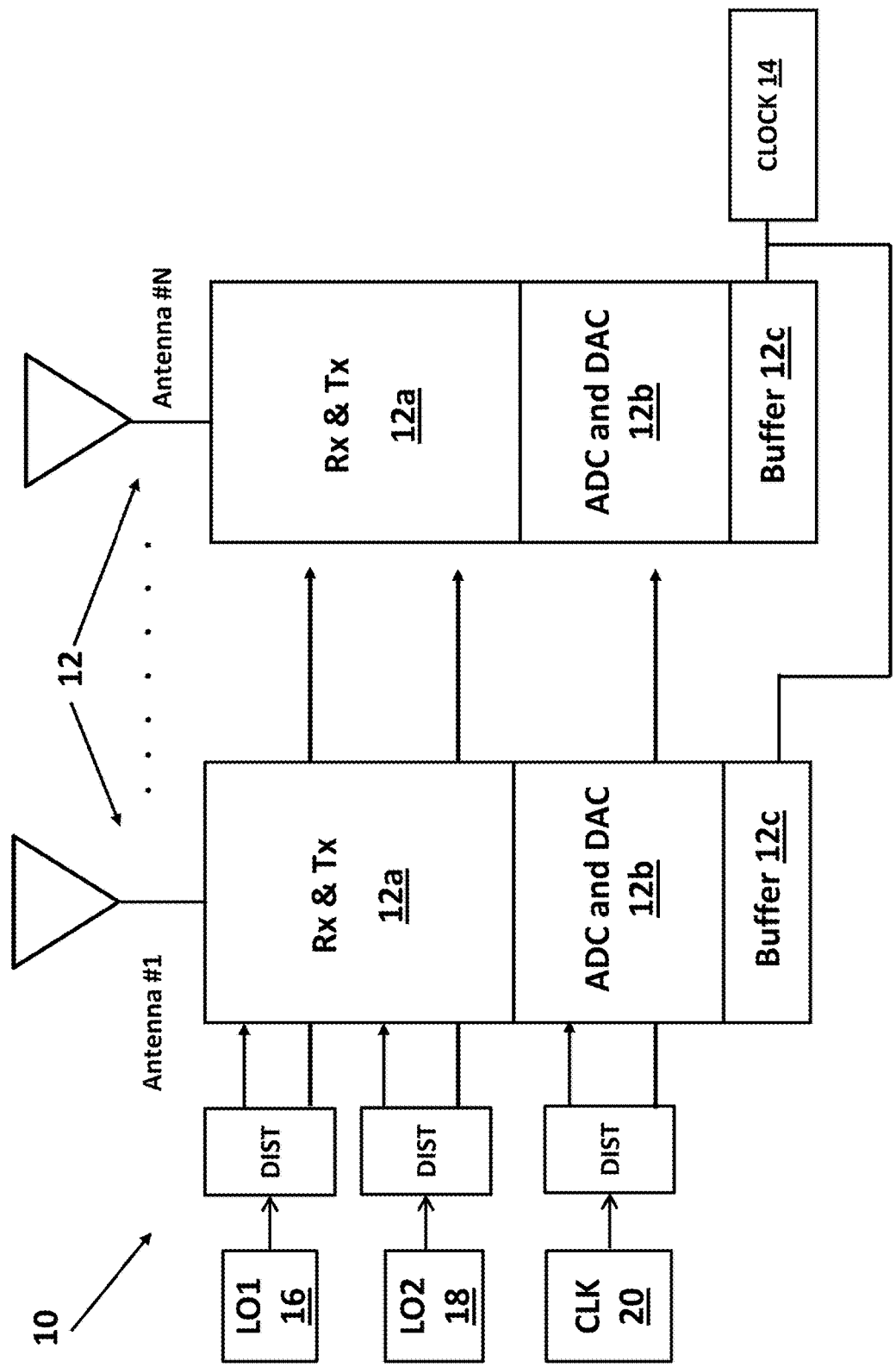
FIG. 2 illustrates an N channel coherent transceiver subsystem (prior art) for precision array processing.

FIG. 2 illustrates a precision array transceiver subsystem 10 using coherent transceivers in which the system has one or more transceivers 12 that each have an antenna (antenna 1, . . . , antenna N) and all of the antennas form the adaptive array and thus need adaptive array processing to receive or transmit signals. Each transceiver 12 may have a receiver and transmitter portion 12a (which are separate circuits for receiving signals and transmitting signals, respectively, but are shown here together for simplicity), signal conversion portion 12b, such as analog to digital (ADC) and digital to analog (DAC) and a buffer 12c. The buffer in each transceivers is controlled in part by a single clock source 14. In the system in FIG. 2, one or more local oscillators (LO1 16 and LO2 18 in FIG. 2) are coupled to each transceiver 12 using a distributor. Furthermore, an ADC/DAC clock 20 is also distributed to each transceiver 12 using the distributor (DIST) as shown. In the system in FIG. 2, the clock distribution becomes problematic as the number of transceivers increases as if the system has distributed components. This challenge may be overcome by a system that uses semi-coherent transceivers for precision array processing.

Figure 3:
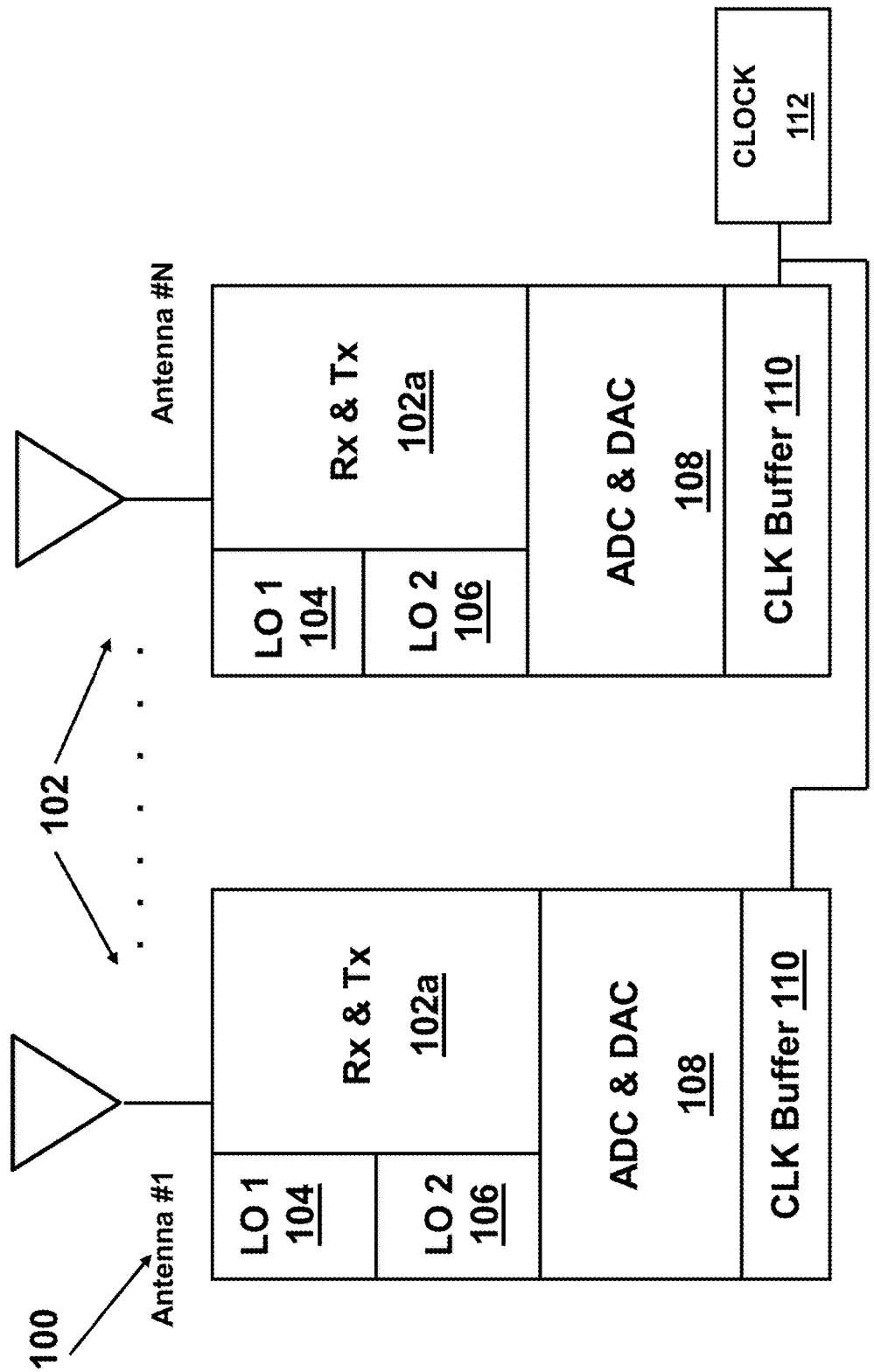
FIG. 3 illustrates an N channel semi-coherent transceiver subsystem for precision array processing (new art)

FIG. 3 illustrates a precision array transceiver subsystem 100 using semi-coherent transceivers 102. In the system 100, there may be a plurality of transceivers 102 that each have an antenna (antenna 1, . . . , antenna N for a number N of transceivers) and all of the antennas form the adaptive array and the transceivers perform the adaptive array processing to receive or transmit signals. Each transceiver 102 may have a receiver and transmitter portion 102a (which are separate circuits for receiving signals and transmitting signals, respectively, but are shown here together for simplicity). Each transceiver 102 also may have integrated local oscillators 104, 106, integrated ADC/DAC circuits 108 and a CLK buffer 110. As with the system in FIG. 2, the buffers are clocked by a clock signal from a clock 112.

The system in FIG. 3 simplifies the design of adaptive array systems and to reduce the cost of the system. Unlike the system in FIG. 2 in which the local oscillator signals and ADC/clock signals are distributed among the transceivers, the system in FIG. 3 removes the requirement for a fully coherent architecture of N transceivers. Instead, a plurality of semi-coherent transceivers 102 driven by a single clock source are used. As shown in FIG. 3, that is an implementation of the system, local LO/Synthesizers are used in each of the N transceivers. Often, as shown in the implementation in FIG. 3, the LO/Synthesizer 104-108 may be integrated with the other components of the transceiver 102 in a single silicon device. Then, each LO/Synthesizer 104-108 may be locked to the incoming clock.

The semi-coherent transceiver architecture in FIG. 3 works by controlling the phase, amplitude and frequency errors between transceiver within an error band over a given time interval. These errors are typically statistical in nature and are predefined at the system level, prior to the design of the transceiver. Once these errors are defined, the topology of the local LO/Synthesizer Phase Lock Loops (PLL) can be determined. Then, the design of the PLLs comprised of VCOs, divider chains, phase detector, loop filters can proceed. In some embodiments, an external common signal source is injected into all N channels to calibrate bulk phase and amplitude offsets among the N channels. Moreover, since in single reference clock with embedded sync is the only requirement to maintain semi-coherency, then the antenna array may be divided into subarrays that are spatially separated at arbitrary displacements.

Design Principles, Equations and Results

Figure 4:
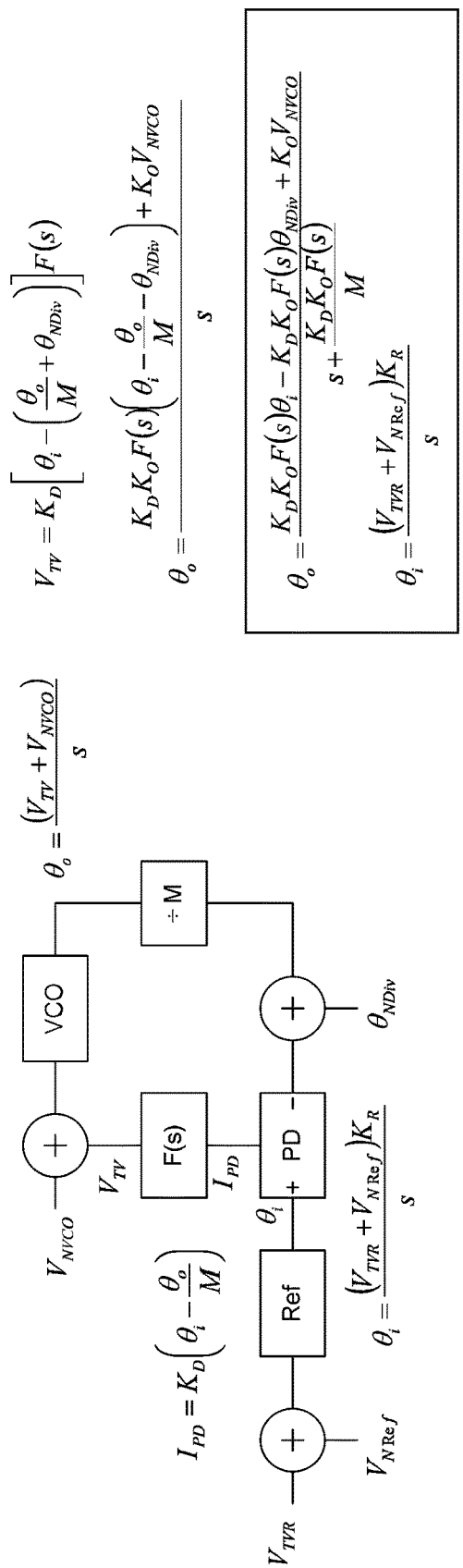
FIG. 4 illustrates a typical phase lock loop (PLL) used in Local Oscillators (LOs), Synthesizers, and Clock Generators.

Local Oscillators are typically realized using PLLs as shown in FIG. 4. A voltage controlled oscillator (VCO) provides the LO frequency of operation. The VCO control voltage is derived from the loop filter F(s) by low pass filtering the phase difference output of a Phase Detector (PD). The phase difference is derived as the reference phase (Ref) less the phase of VCO divided by a factor M. Thus the output frequency of the VCO is M times the reference frequency and locked exactly to the phase of the reference.

FIG. 4 also illustrates additive noise terms that effect the performance of the PLL. These terms appear in real world embodiments of VCOs, dividers, PDs, and the reference signal. The noise terms cause the phase of VCO to deviate from the phase of the reference. Thus, two such VCOs operating with the same reference will not be coherent—that is, the phase difference between VCO1 and VCO2 will not be zero since the noise terms in each PLL are independent statistical processes, However, the statistics of this phase difference can be controlled so that the VCOs are "semi-coherent". Well designed semi-coherent VCOs and the LOs derived from them can be thought of as coherent from an adaptive array processing point of the view give certain performance criteria. In this disclosure, one performance criteria is spatial null depth. Perfect coherency permits infinitely deep spatial null depths when cancelling interference. That is, any interference regardless of power level can be cancelled. Semi-coherent transceivers cause the spatial nulls to fill in to a given depth. If an interference is stronger than the null depth, then the interference cannot be cancelled perfectly.

The equations in FIG. 4 show the expressions for $\theta o$ and $\theta i$ in the s domain. In FIG. 4, there are 3 noise sources which include:

$V_{NRef}$ which is a phase noise of the reference oscillator.
$V_{NVCO}$ which is the phase noise of the VCO.
$\theta_{NDiv}$ which is the divider phase noise.

Each noise source has a different transfer function to the output phase noise $\theta_o$.

Figure 5:
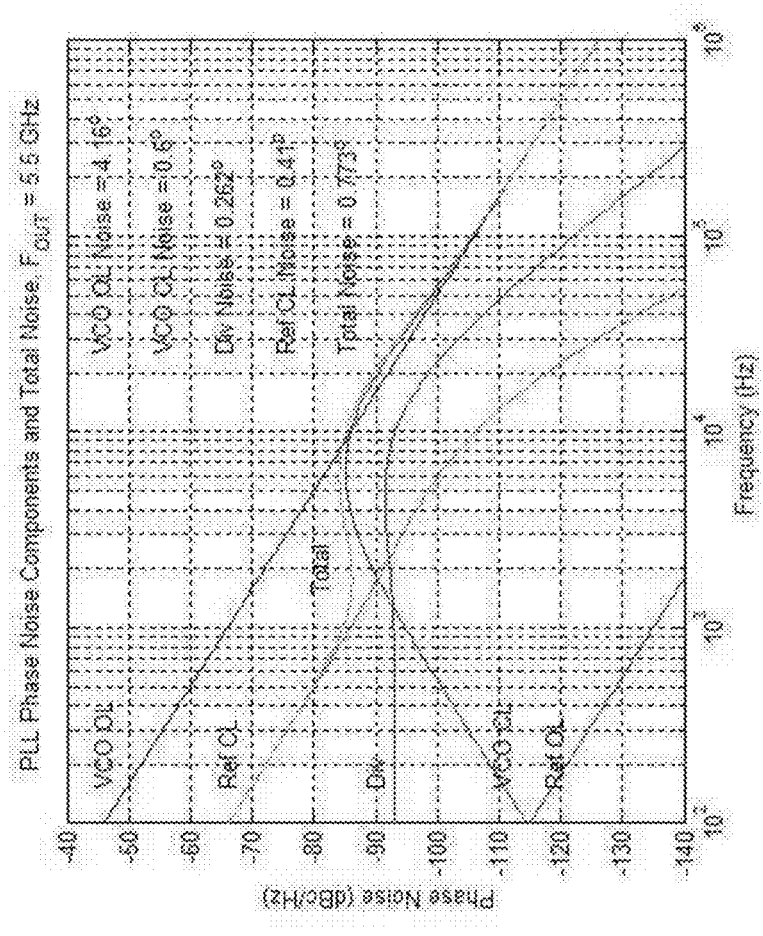
FIG. 5 illustrates the phase noise for an exemplary PLL in the Frequency Domain.

FIG. 5 provides the parameters of well designed PLL of FIG. 4 designed for a 5.5 GHz LO in an N channel semi-coherent transceiver subsystem as part of a modern adaptive array processor. It also illustrates the phase noise for each of noise components of this embodiment as a function of frequency. Finally, the total composite phase noise off the PLL is shown as 0.773 degrees. Excellent phase noise performance at this level ensures that the semi-coherent transceiver design will perform in a similar fashion to the fully coherent design for most practical applications.

For the frequency domain modeling plot shown in FIG. 5, the following parameter values were used to generate the results in the plot:

Fu=10 kHz
PM=60°
Fref=20 MHz
Fout=5.5 GHz
M=275
Ref OL phase noise=−135 dBc/Hz at 1 kHz
VCO OL phase noise=−106 dBc/Hz at 100 kHz
FOM=−215 (−93.2 dBc/Hz)
$K_O=2\pi*100$ MHz/V
$K_D=2\pi*5$ mA/rad
$K_R=21\pi*100$ kHz/V.

Figure 6:
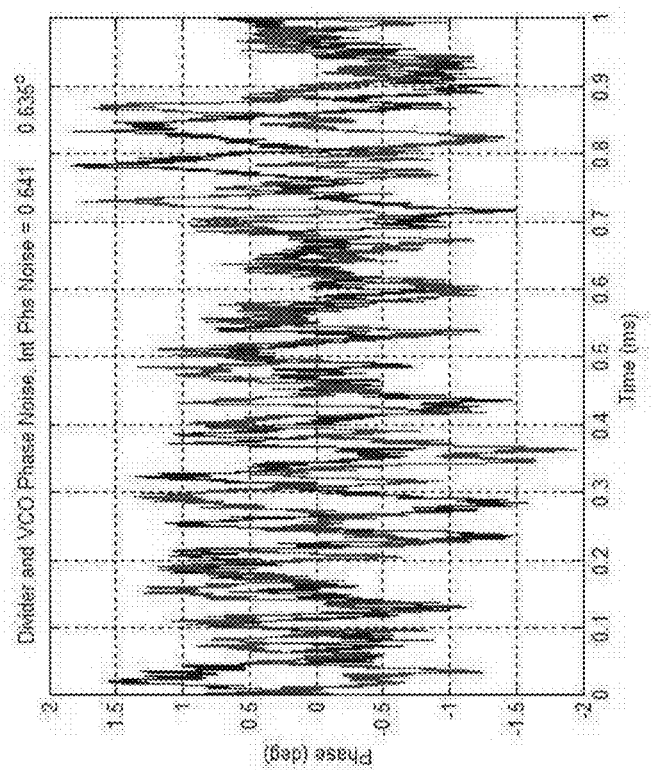
FIG. 6 illustrates the time domain phase noise on 2 PLLs used in a two channel semi-coherent transceiver.

This is further illustrated in FIG. 6. The LO phase noise from two independent PLLs are generated using the design of FIG. 4 and the parameters of FIG. 5. Each PLL forming LO1$a$ and LO1$b$ was driven from a common CLOCK reference as shown in FIG. 3. The two LOs were used to downconvert an OFDMA waveform (WiMax, LTE) to form two time domain sequences as illustrated. The two waveforms and then substracted to determining their similarity, coherency and null depth of two waveforms when subtracted.

The plot in FIG. 6 shows the 2 LO noise sequences. A simulation of the effect of the LO phase noise from 2 independent PLLs on an OFDM waveform was performed. Specifically, two LO sequences were generated, one for each of two downconverter channels. The two sequences were modeled as having coherent references, but independent VCO noise and divider noise components. Then, an OFDM waveform was generated and the OFDM waveform was mixed with both LO sequences, forming 2 sequences. Then, the phase difference between the two sequences was measured and the two sequences were subtracted, yielding a null, whose depth is determined by the phase errors due to the phase noise on each OFDM tone.

Figure 7:
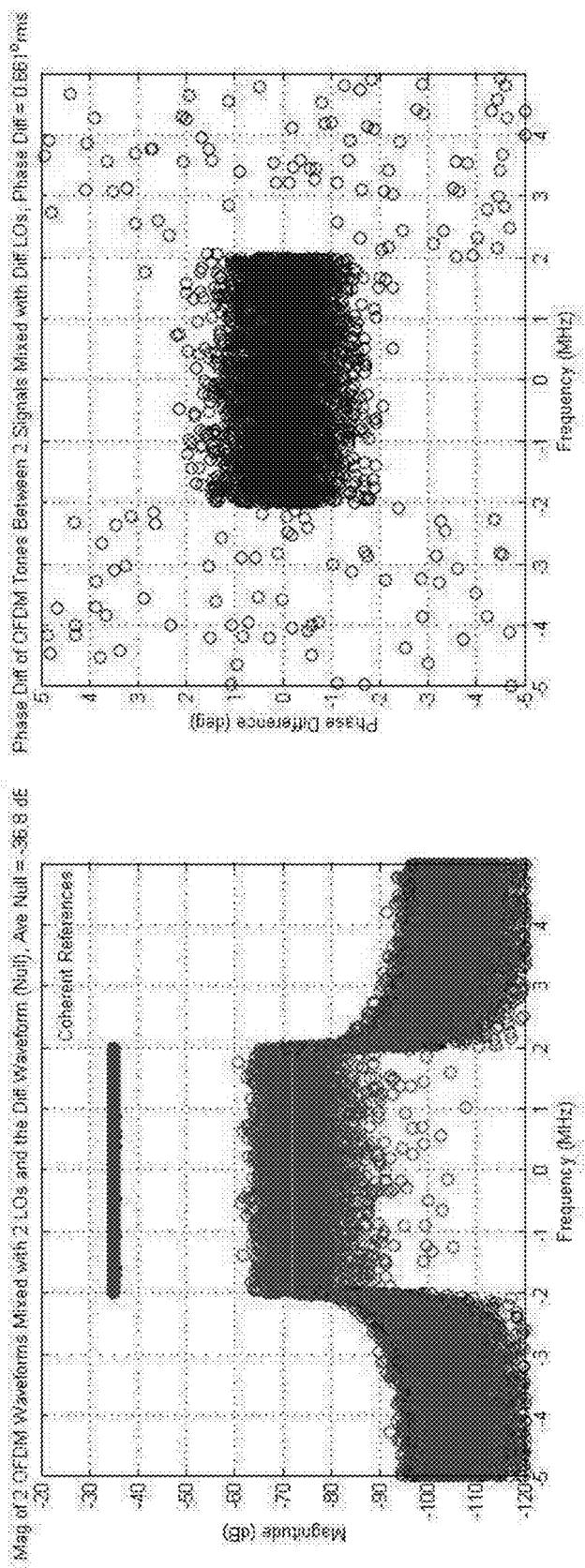
FIG. 7 illustrates the null depth of a two channel semi-coherent transceiver used for adaptive beamforming and null steering.

FIG. 7 illustrates the result. In this figure, the two time domain waveforms and the difference waveform are transformed into the frequency domain by an FFT, that is the same FFT used to process the OFDMA waveform for demodulation. The average null depth of the phase difference waveform is −36.8 dB when referenced to the power in either baseband waveform.

FIG. 7 shows OFDM null depth results. The left plot in FIG. 7 shows the 2 OFDM waveforms generated with independent LOs (blue and green plots) and the null formed by subtracting them (red plot). The average null depth is −36.8 dB. The right plot in FIG. 7 shows the phase difference between the 2 different OFDM waveforms. The rms value of phase difference across the OFDM tones is 0.66°, which is just about the same as the integrated phase noise. The average null depth of −36.8 dB also correlates with the 0.66° phase error. The number of tones is 4000 and the tone spacing is 1 kHz and note that the time duration for this simulation is only 1 ms, as opposed to 10 ms for the previous simulations.

Figure 8:
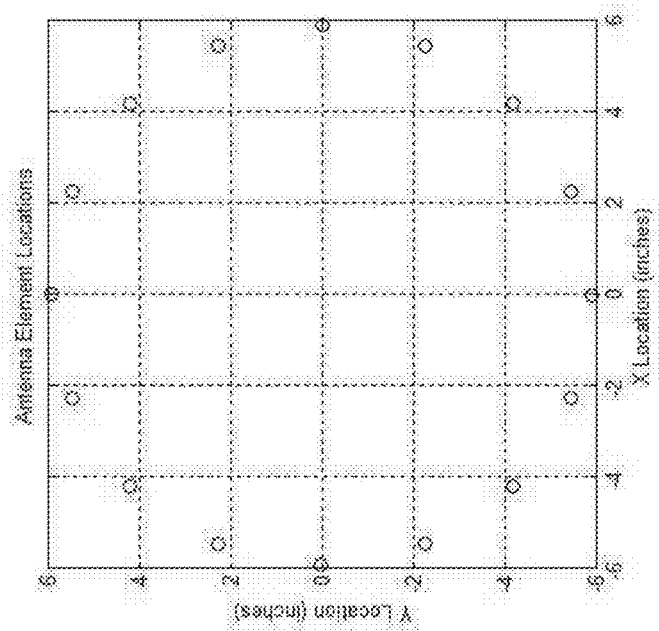
FIG. 8 shows an exemplary adaptive antenna array used in the test of a 16 antenna semi-corherent adaptive array processing system.
Figure 8:
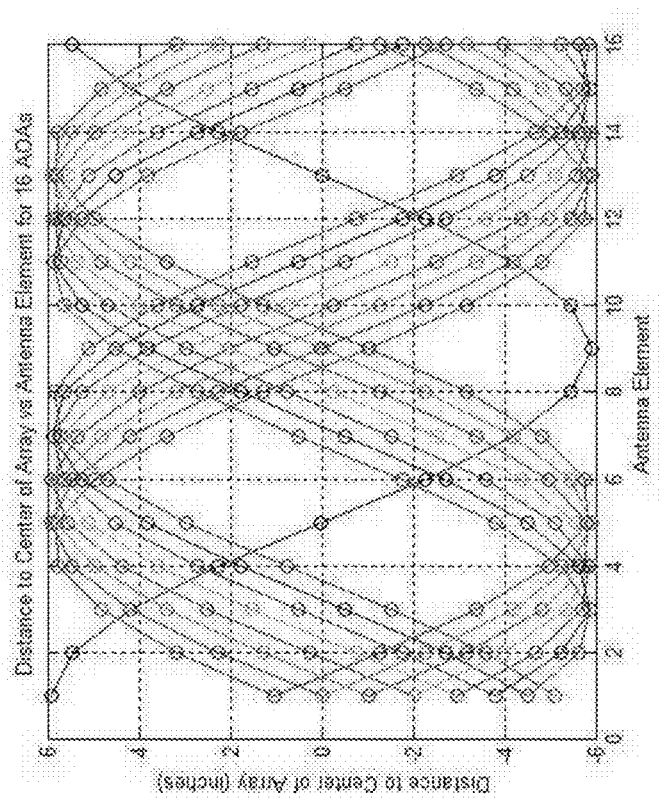

FIG. 8 extends the performance analysis to a 16 antenna semi-coherent transceiver subsystem used as the front end of an adaptive array processor. There are 16 semi-coherent LOs using the design of FIG. 4 with parameters of FIG. 5. The geometry of the antenna array is shown in on the left and the distance to the center of the array is shown on the right for selected angles of arrival (AOA). The AOAs may be assigned to one signal of interest and 15 other interferences. The performance of the interference cancellation relative to the desired signal may then be measured as limited by the semi-coherency of the transceivers.

FIG. 8 illustrates a beamformer simulation and the left plot shows the layout of the 16-element circular array. The simulation was performed at 1 GHz with radius equal to lamda/2. The right plot in FIG. 8 shows the distances from the elements to the center of the array for AOAs of 0, 80, 90, 100, 120, 130, 140, 150, −80, −90, −100, −120, −130, and −140 degrees.

Figure 9:
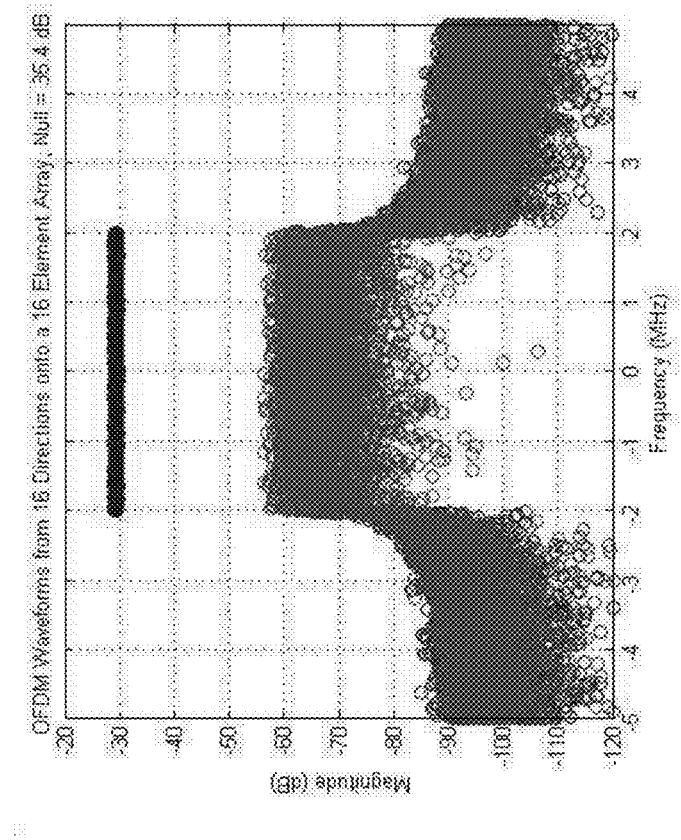
FIG. 9 shows the resulting null depth of the adaptive array processor using the semi-coherent processing of the 16 PLLs of FIG. 4.

FIG. 9 illustrates the result as generated by the adaptive array processor using the 16 channel semi-coherent transceiver with the signal-of-interest in the presence of 15 interferences. The graph illustrates a 35.4 dB nulling level between the desired signal and the sum of all 15 interferring signals. To generate this result, the adaptive processor generates the beam and null steering solution in the presence of the desired signal to "copy" the signal shown at −29 dBm. It is then toggled off to record the sum of all "leakage" interference caused by the 16 channel semi-coherent transceiver subsystem.

FIG. 9 illustrates simulation Results with 16 OFDM Waveforms. The plot in FIG. 9 shows the results of the simulation with all 15 interferers present. The blue plot is the beamformer output with all 16 independent signals present (16 AOAs: desired signal plus 15 interferers). The green plot is the beamformer output with the desired signal amplitude set to zero and all 15 interference signals present. The null depth in this case is 35.4 dB. The difference between this case and the previous case is 12 dB. This is expected since the previous case had 1 interferer and this case has 15 interferes and 10 LOG(15)=11.8 dB.

Figure 10:
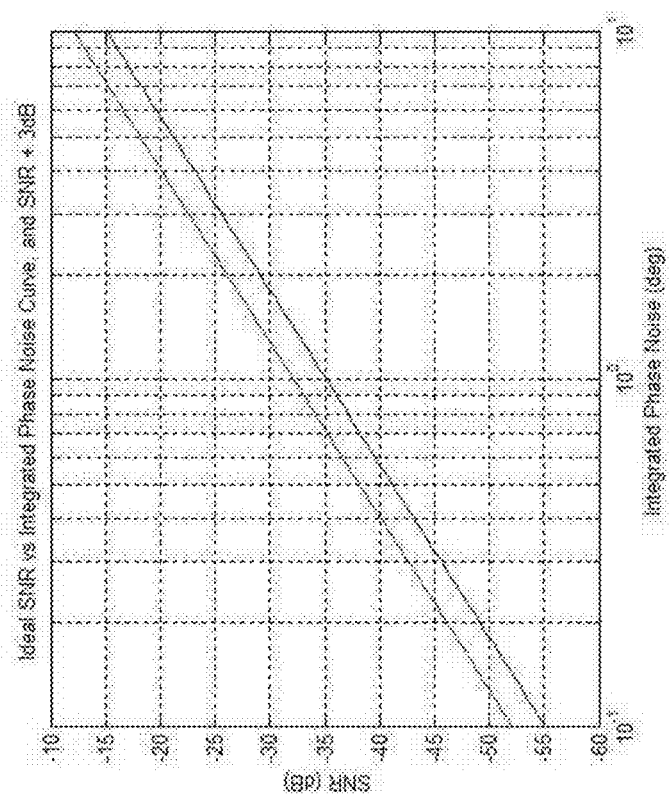
FIG. 10 illustrates the null depth of semi-coherent adaptive array processor as a function of PLL phase noise.

FIG. 10 summarized the major finding of this invention. The relationship between integrated LO phase noise and the Signal to Interference and Noise (SINR) of the desired signal in interference is simply expressed as:

SINR=20*log($PN$) where $PN$ is expressed in radians.

If the number of number of interferences is large and is equal to the number of antennas, then the SINR is simple expressed as SINR=20*log($PN$)+3 where $PN$ is expressed in radians.

In summary, the viability of the semi-coherent transceiver architecture when used in adaptive array processing has been demonstated in an practical embodiment. Its performance approaches the performance of the fully coherent design for many practical designs. As an example, if the required SINR is 25 dB for accurate demodulation and the phase noise is 0.5 deg rms yielding an SINR of −37 dB due to this impairment, then the required signal to gaussain noise should be 25.27 dB. Thus, the semi-coherent transceiver penalty is only 0.27 dB compared to the fully coherent design.

FIG. 10 shows the results that have an improvement in beamformer output SNR when only 1 interferer is present, vs N interferers, with the degradation decreasing as 10*LOG N. For a single OFDM waveform and channel, there is a relationship between the LO phase noise and signal SNR given by SNR=20*LOG(PN). This curve is plotted in blue in FIG. 10. For the fully loaded array case (16 signals for 16 elements studied here), the null depth is about 3 dB worse than the blue curve. The green curve is Null=20*LOG(PN)+3. This curve matches the simulation results as the phase noise is varied.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An adaptive array radio system, comprising:
    a plurality of semi-coherent RF transceivers, each RF transceiver having an antenna, one or more local oscillators, one or more converters and a clock buffer;
    an adaptive antenna array formed by the plurality of antennas of the plurality of RF transceivers;
    the clock buffer in each semi-coherent RF transceiver being clocked using a clock signal distributed to each semi-coherent RF transceiver; and
    each of the plurality of RF transceivers performing precision adaptive array processing using the one or more local oscillators and the one or more converters of each RF transceiver that are clocked based on a clock derived from an incoming signal and each local oscillator is locked to the clock derived from the incoming signal for the RF transceiver.

2. The adaptive array of claim 1, wherein the plurality of semi-coherent RF transceivers eliminates the requirements for distribution of the clock for the one or more local oscillator and the one or more converters.

3. A method for multiplexing subarrays of antenna/transceivers into a single data stream, the method comprising:
    providing a plurality of semi-coherent RF transceivers, each RF transceiver having an antenna, one or more local oscillators, one or more converters and a clock buffer;
    receiving an incoming signal at each semi-coherent RF transceiver;
    deriving a clock in each semi-coherent RF transceiver for the one or more local oscillators and one or more converters in each semi-coherent RF transceiver from the incoming signal;
    clocking the clock buffer in each semi-coherent RF transceiver with a clock that is distributed to each semi-coherent RF transceiver; and
    locking each local oscillator in each RF transceiver to the clock derived from the incoming signal received at each RF transceiver.

* * * * *